(12) United States Patent
Pham

(10) Patent No.: US 7,779,449 B2
(45) Date of Patent: Aug. 17, 2010

(54) SECURED NETWORK PROCESSOR

(75) Inventor: Tuan A. Pham, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 1068 days.

(21) Appl. No.: 11/105,126

(22) Filed: Apr. 13, 2005

(65) Prior Publication Data

US 2006/0236365 A1 Oct. 19, 2006

(51) Int. Cl.
*H04L 9/26* (2006.01)
(52) U.S. Cl. .......................................... 726/1
(58) Field of Classification Search ...................... 726/1
See application file for complete search history.

(56) References Cited

U.S. PATENT DOCUMENTS

| | | | |
|---|---|---|---|
| 6,272,148 B1* | 8/2001 | Takagi et al. ................. | 370/469 |
| 6,392,668 B1* | 5/2002 | Murray ....................... | 715/738 |
| 6,677,888 B2* | 1/2004 | Roy ............................ | 342/36 |
| 7,054,322 B2 | 5/2006 | D'Annunzio et al. ....... | 370/401 |
| 2002/0032006 A1* | 3/2002 | Nair et al. .................... | 455/66 |
| 2003/0002438 A1* | 1/2003 | Yazaki et al. ................ | 370/229 |
| 2003/0009585 A1* | 1/2003 | Antoine et al. .............. | 709/238 |
| 2003/0056015 A1* | 3/2003 | Hieb et al. ................... | 709/249 |
| 2003/0084451 A1* | 5/2003 | Pierzga et al. ................ | 725/47 |
| 2003/0149787 A1* | 8/2003 | Mangan ....................... | 709/238 |
| 2004/0111640 A1* | 6/2004 | Baum ......................... | 713/201 |
| 2005/0129019 A1* | 6/2005 | Cheriton ..................... | 370/392 |

FOREIGN PATENT DOCUMENTS

WO WO03/021866 * 3/2003

OTHER PUBLICATIONS

AEEC: "Draft 3 of ARINC project paper 664: Aircraft data network, Part 5: Network domain characteristics and interconnection"; Online; Nov. 4, 2004; URL: http://web.archive.org/web/20050205154616/www.arinc.com/aeec/draft_documents/664p5_d3.pdf.
AEEC: "Draft 4 of supplement 1 to ARINC Specification 664: Aircraft data network, Part 4: Internet-based Address Structure & Assigned numbers"; Online; Nov. 4, 2004; URL: http://web.archive.org/web/20050205160353/www.arinc.com/aeec/draft_documents/664p4_d4s1.pdf.

* cited by examiner

Primary Examiner—Nasser Moazzami
Assistant Examiner—Michael S McNally
(74) Attorney, Agent, or Firm—Yee & Associates, P.C.; Baldwin D. Quan

(57) ABSTRACT

A method and system for sharing data between networks comprises an interface for receiving data from plural inputs; a policy-based router operationally connected to the interface, the policy-based router assigns security levels to the data based on security characteristics of the inputs and the policy-based router assigns virtual Internet protocol addresses to the data; a memory for retaining the data with the Internet protocol addresses, the memory being operationally connected to the policy-based router; a translator for converting the data into a standard format; and a network stack for transmitting the data to a network. The method includes assigning security levels to the data based on security characteristics of the inputs; assigning virtual Internet protocol addresses to the data; retaining the data with the Internet protocol addresses; converting the data into a standard format; and transmitting the data to a network.

12 Claims, 6 Drawing Sheets

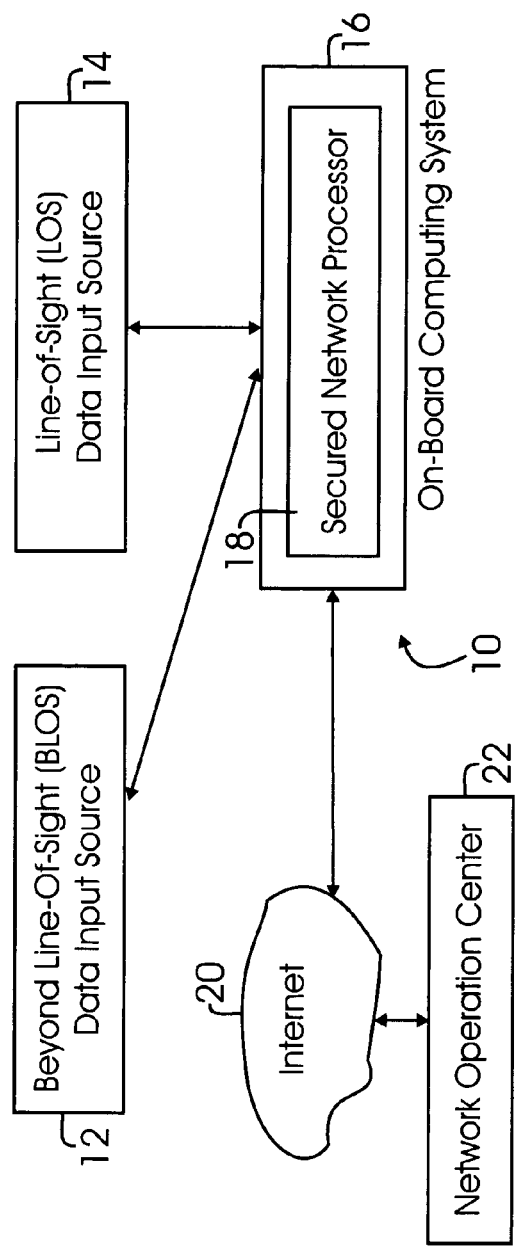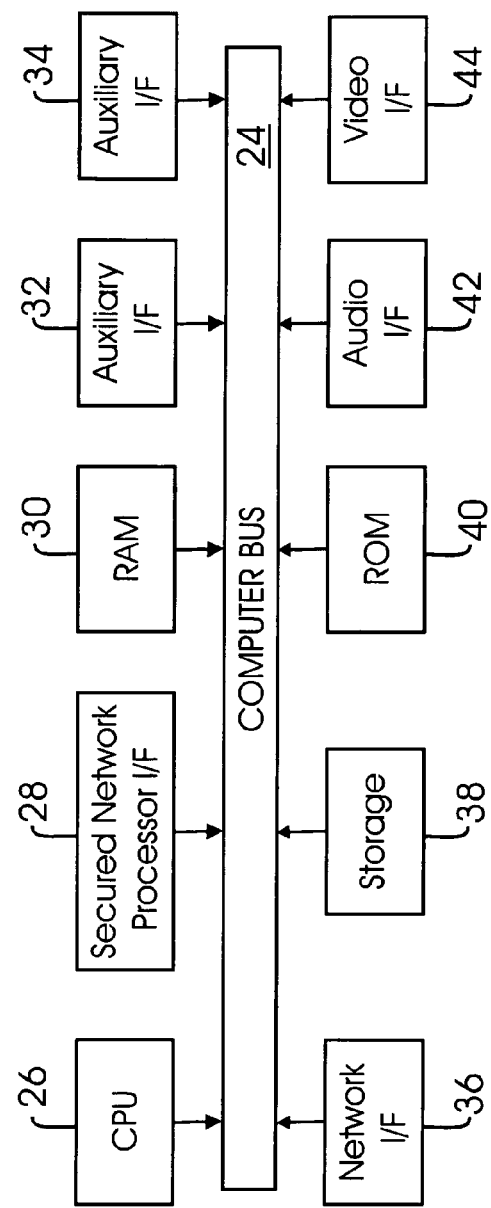

SECURED NETWORK PROCESSOR

BACKGROUND OF THE INVENTION

1. Field of the Invention

The present invention relates to a system and method for network communication, and more particularly, to a system and method for processing legacy radio signals.

2. Background

Aircrafts (or other transport systems) are monitored by a central network computing system located at a network operation center ("NOC"). It is desirable for the NOC to have a global view of various aircrafts (military and/or commercial), whether grounded or in air. Hence, it is important for transport systems (e.g. aircrafts) to efficiently receive and process plural data inputs.

In the past, multiple single-band radio systems have been used for communication between transport units and NOCs. Such radio systems (referred to as "legacy radio" systems), are often incompatible with each other and with modern radio systems.

The U.S. Department of Defense has created radio system designs, such as the Joint Tactical Radio System (JTRS) to provide Internet Protocol (IP) radio interfaces for modern and legacy platforms. However, these systems require expensive retrofit programs and development of new avionics software.

Conventional systems process inputs from plural radio links using custom software/hardware interfaces. Every time a new link is added to an aircraft, new application specific hardware/software is needed to process data inputs.

Conventional military systems do not have enabling web (or Internet) service software technologies to facilitate data sharing between incompatible networks. Without standard software interfaces, a legacy radio digital link would require extensive application/platform specific software so that information can be exchanged between one platform/network to another (i.e. for machine-to-machine interface). The lack of this machine-to-machine interface for legacy systems has largely prohibited these dissimilar systems/networks from rapidly sharing information among themselves and others.

Conventional systems do not provide an integrated solution that can efficiently process data inputs from legacy radio links. Also, especially in aviation systems, securing communication is very important. Conventional systems are not able to categorize data inputs based on their security level and process them accordingly.

Therefore, what is desired is a method and system that can efficiently process data inputs from legacy radio links and/or other input sources.

SUMMARY OF THE INVENTION

In one aspect of the present invention, a system for sharing data between networks comprises an interface for receiving data from plural inputs; a policy-based router operationally connected to the interface, the policy-based router assigns security levels to the data based on security characteristics of the inputs and assigns virtual Internet protocol addresses to the data; a translator for converting the data into a standard format; and a network stack for transmitting the data to a network.

In another aspect of the present invention, a method for sharing data between networks comprises receiving data from plural inputs; assigning security levels to the data based on security characteristics of the inputs; assigning virtual Internet protocol addresses to the data; retaining the data with the Internet protocol addresses; converting the data into a standard format; and transmitting the data to a network.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIG. 1 is a block diagram of a system for exchanging data between networks, according to an embodiment of the present invention;

FIG. 2 is a block diagram showing the internal functional architecture of an on-board computing system shown in FIG. 1;

DETAILED DESCRIPTION OF THE PREFERRED EMBODIMENTS

Figure 3:
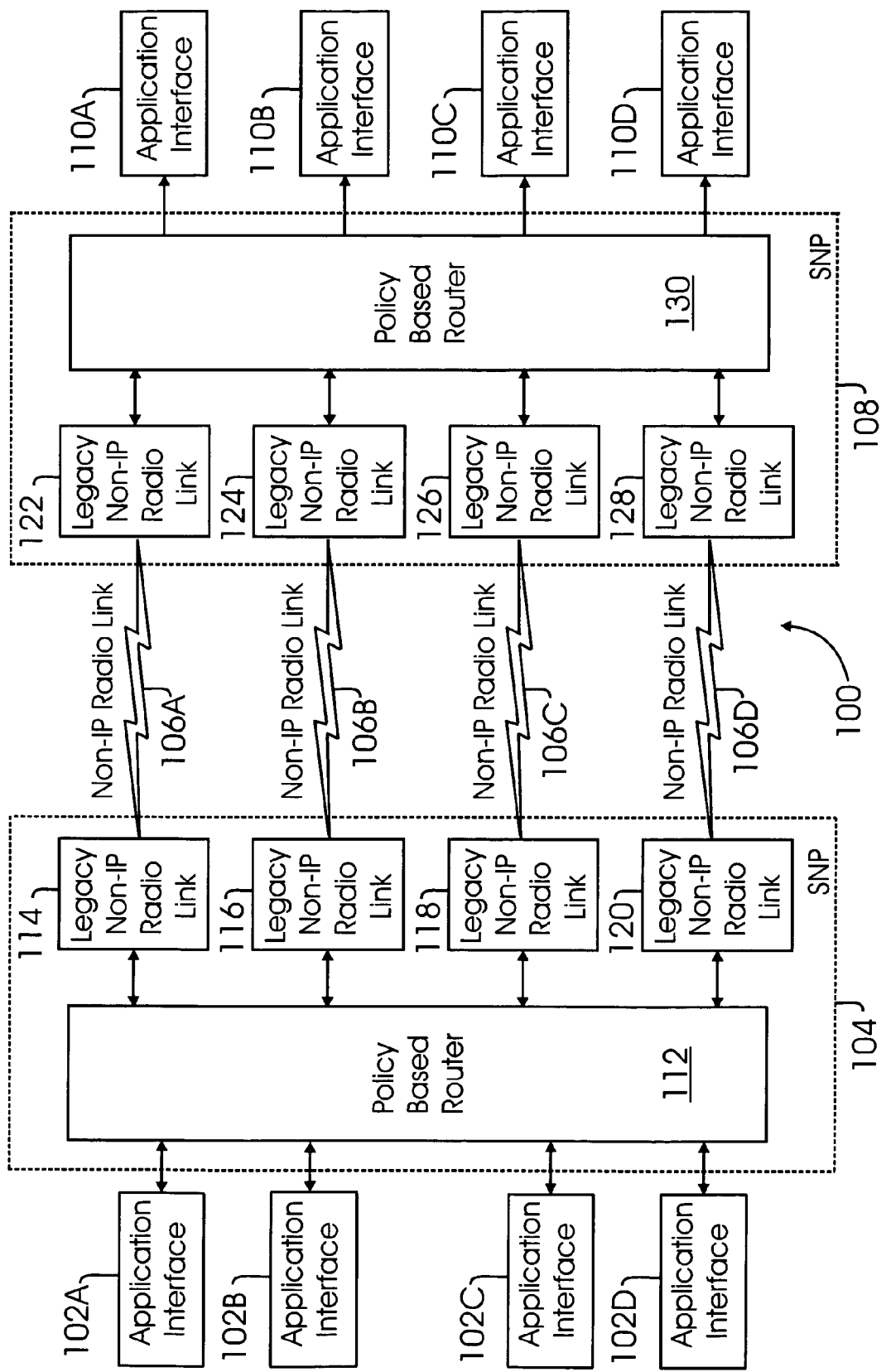
FIG. 3 is a block diagram of a system for secured communication between networks, according to another embodiment of the present invention.

The following detailed description is of the best currently contemplated modes of carrying out the invention. The detailed description is not to be taken in a limiting sense, but the detailed description is made merely for the purpose of illustrating the general principles of the invention, since the scope of the invention is best defined by the appended claims.

To facilitate an understanding of the preferred embodiment, the general architecture and operation of an on-board computing system will be described. The specific architecture and operation of the preferred embodiments will then be described with reference to the general architecture.

Network Centric Operations (NCO) Architecture:

FIG. 1 is a block diagram of a system 10 for communicating data between networks. An off-board communications domain may comprise a Beyond Line-Of-Sight Data Input Source 12 and a Line-Of-Sight Data Input Source 14.

The Beyond Line-Of-Sight Data Input Source 12 includes satellite-based sources, of over about 600 miles (about 966 kilometers) in range, such as ultra-high frequency and very high frequency satellite communications (UHF/VHF SATCOM), international marine and maritime satellite communications (INMARSAT), Aircraft Communications Addressing and Reporting System (ACARS), Family of Advanced Beyond-Line-of-Sight Terminals (FAB-T), and the like.

The Line-Of-Sight Data Input Source 14 includes sources, with about 0-30 miles (up to about 48.28 kilometers) in range, such as LINK-16 (a military inter-computer data exchange format), Flying Local Area Network (FLAN), Wideband Network Waveform of the Joint Tactical Radio System (JTRS WNW), and the like.

The Beyond Line-Of-Sight Data Input Source 12 and the Line-Of-Sight Data Input Source 14 communicate with an on-board computing system 16, which comprises of a secured network processor 18.

It is noteworthy that the present invention is not limited to a particular number of on-board computing systems 16. Any number of on-board computing systems 16 that can be connected to the Internet 20 or any other computer network may be used.

The on-board computing system 16 may be installed aboard a vehicle (not shown), such as a spacecraft, an aircraft, a tank, an automobile, a vessel, and the like. Although the following description uses an aircraft as an exemplary embodiment, it is to be understood that the present invention may be practiced with all types of vehicles or on foot. For example, the on-board computing system 16 may be installed aboard an automobile.

Furthermore, it is to be understood that the present invention may be practiced at stationary or movable locations. For example, the on-board computing system 16 may be installed aboard a moving vehicle as well as being installed at a fixed building, such as a ground-based air traffic control station.

The term "data" is to be understood in the description to include any type of information. For example, the data communicated or exchanged may be of any type of information, including one of the groups consisting of control data, audio, voice, image, and video.

The Beyond Line-Of-Sight Data Input Source 12, the Line-Of-Sight Data Input Source, and the on-board computing system 16 may exchange data with a network operation center 22 via any network, for example, the Internet 20.

Computer System Architecture

FIG. 2 is a block diagram showing the internal functional architecture of the on-board computing system 16, exclusive of the secured network processor 18. The secured network processor 18 will be described below regarding FIG. 3. As shown in FIG. 2, system 16 includes a central processing unit (CPU) 26 for executing computer-executable process steps. CPU 26 interfaces with a computer bus 24. Also shown in FIG. 2 is a secured network processor interface (I/F) 28, which may be operationally coupled to the secured network processor 18 (shown in FIG. 1).

A random access main memory ("RAM") 30 may also be operationally coupled to interface with computer bus 24 to provide CPU 26 with access to memory storage when executing stored computer-executable process steps from storage 38. Storage 38 may comprise storage media such as a floppy disk, a hard disk, a compact disc (CD), a digital versatile disk (DVD), and the like. CPU 26 stores and executes the process steps out of RAM 30. Items operationally coupled to the computer bus 24 may be hardware-based or software-based.

Auxiliary interfaces 32 and 34 may be operationally coupled to the computer bus 24 to interface with other desired components, such as a navigational system (not shown), a global positioning satellite (GPS) system (not shown), a laser system (not shown), or a microwave signal system (not shown).

A network interface 36 may be operationally coupled to the computer bus 24 to interface with any of several networks (not shown).

Read only memory ("ROM") 40 may be operationally coupled to the computer bus 24 to store invariant instruction sequences such as start-up instruction sequences or basic input/output operating system (BIOS) sequences for the secured network processor 18 (shown in FIG. 1).

Continuing with FIG. 2, an audio interface 42 and a video interface 44 may be operationally coupled to the computer bus 24 for interfacing with audio equipment and video equipment, respectively.

The following provides a description of the Internet that can used for communication among various components of system 10 (FIG. 1).

The Internet:

The Internet 20 connects thousands of computers world wide through well-known protocols, for example, Transmission Control Protocol (TCP)/Internet Protocol (IP), into a vast network. TCP/IP is a communications protocol developed under contract from the United States Department of Defense to internetwork dissimilar systems. TCP/IP is the de facto UNIX standard protocol of the Internet and the global standard for communications. Every client and server in a TCP/IP network requires an IP (Internet Protocol) address, which is either permanently assigned or dynamically assigned at startup.

Information on the Internet 20 is stored world wide as computer files, mostly written in the Hypertext Mark Up Language ("HTML"). Other mark up languages, e.g., Extensible Markup Language ("XML") as published by W3C Consortium, Version 1, Second Edition, October 2000, ©W3C may also be used.

The collection of all such publicly available computer files is known as the World Wide Web ("WWW"). The WWW is a multimedia-enabled hypertext system used for navigating the Internet 20 and is made up of hundreds of thousands of web pages with images and text and video files, which can be displayed on a computer monitor. Each web page can have connections to other pages, which may be located on any computer connected to the Internet 20.

A typical Internet 20 user uses a client program called a "Web Browser" to connect to the Internet 20. The web browser may run on any computer connected to the Internet 20. Currently, various browsers are available of which two prominent browsers are Netscape Navigator and Microsoft Internet Explorer.

The Web Browser receives and sends requests to a web server and acquires information from the WWW. A web server is a program that, upon receipt of a request, sends the requested data to the requesting user. A standard naming convention known as Uniform Resource Locator ("URL") has been adopted to represent hypermedia links and links to network services. Most files or services can be represented with a URL.

URLs enable Web Browsers to go directly to any file held on any WWW server. Information from the WWW is accessed using well-known protocols, including the Hypertext Transport Protocol ("HTTP"), the Wide Area Information Service ("WAIS") and the File Transport Protocol ("FTP"), over TCP/IP protocol. The transfer format for standard WWW pages is Hypertext Transfer Protocol (HTTP).

Communicating Between Secured Network Processors:

FIG. 3 shows a block diagram of a system 100 for communicating between networks. A plurality of application interfaces 102A-102D may be operationally coupled to a secured network processor (SNP) 104 (similar to SNP 18, FIG. 1). A plurality of non-IP radio links 106A-106D may be used to exchange data between the secured network processor 104 and another secured network processor 108. Another plurality of application interfaces 110A-110D may be operationally coupled to the secured network processor 108.

The secured network processors 104, 108 may be installed at separate locations. For example, the secured network processor 104 may be situated at a ground station (not shown) while the secured network processor 108 may be situated aboard an aircraft (not shown). The ground station (not shown) and the aircraft (not shown) may communicate via the non-IP radio links 106A-106D.

In another embodiment, the secured network processor 104 may be situated aboard a first aircraft (not shown) and the secured network processor 108 may be situated aboard a second aircraft (not shown). The first aircraft (not shown) and the second aircraft (not shown) may communicate via the non-IP radio links 106A-106D.

In the secured network processor 104 a policy-based router 112 serves to direct the exchange of data between the application interfaces 102A-102D and a plurality of legacy non-IP radio links (or interfaces/devices) 114, 116, 118, and 120 (may also be referred to as modules 114, 116, 118 and 120). The policy-based router 112 may be a secured IP network router.

As data is communicated, via non-IP radio links (or non-IP radio connection) 106A-106D (may also be referred to as links 106A-106D), from the secured network processor 104 to the secured network processor 108, data may be received at a plurality of legacy non-IP radio links (interfaces) 122, 124, 126, 128 (may also be referred to as modules 122, 124, 126 and 128). A policy-based router 130 serves to direct the exchange of data between modules 122, 124, 126, 128 and a plurality of application interfaces 110A-110D.

Figure 4:
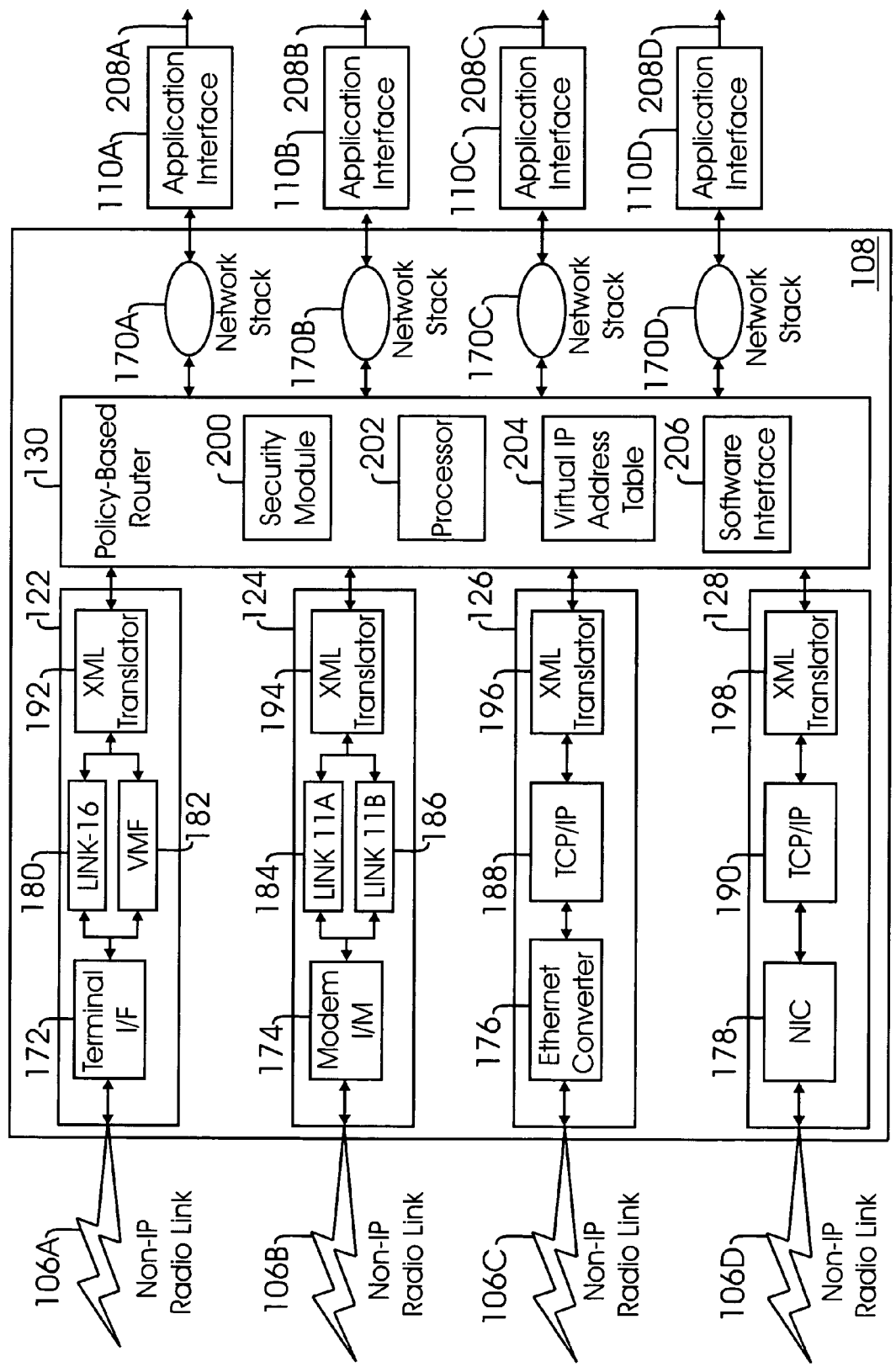
FIG. 4 is a block diagram of an exemplary secured network processor, according to another embodiment of the present invention.

FIG. 4 shows a block diagram of information flow through the secured network processor 108. It is to be understood that the flow of information in secured network processor 108 is exemplary and that a similar flow of information, in reverse, is correspondingly contemplated for secured network processor 104.

Data may be sent to the secured network processor 108 via any one or more of a plurality of links 106A-106D. Any one or more of the plurality of links 106A-106D may communicate with any one or more of a plurality of modules 122-128.

The data may be exchanged among any one or more of a plurality of modules 122-128, the policy-based router 130, and any one or more of a plurality of network stacks 170A-170D.

The network stacks 170A-D direct data in cooperation with the policy-based router 130, to any one or more of a plurality of application interfaces 110A-110D. From the application interfaces 110A-110D, the data is sent to one or more networks 208A-208D, respectively.

The policy-based router 130 determines the security level of the data arriving through the non-IP radio links 106A-106D, depending on the security characteristics of the data. Some data may be characterized as having a secret level (i.e. high security level, such that the data comprises classified information, such as military intelligence data. Some data may be characterized as having an unclassified-but-sensitive (UBS) level, such that the data does not comprise classified information but the data does comprise information to be kept confidential (such as passenger or crew identity). Some data may be characterized as not having a secret or a UBS level (i.e. unsecured). Lastly, some data may be characterized as having security levels in between the security levels described above.

Modules 122-128:

Each of modules 122-128 comprises an interface, a data exchange format component, and a format translator, such as an XML translator (for example, the ECS/XML processor available from Electronic Commerce Solutions, Limited of Horsham in the United Kingdom).

For example, module 122 may comprise a terminal interface 172 (such as the Nais model available from the Matsushita Electrical Industrial Company, Limited of Osaka, Japan), a LINK-16 component 180 (providing an inter-computer data exchange format), a Variable Message Format (VMF) component 182, and an XML translator 192 for converting data into an XML format.

The terminal interface 172 may be a radio control interface (hardware and software) that keeps a link active (such as a USB bus or a 1553 bus). The terminal interface 172 can receive the data from link 106A, reformat the data, parse the data, recognize the data, and align the data.

VMF is a member of the J-Series family of message formats, along with Link-16, Link-22, and the Common Message Format (CMF). VMF messages provide a common means of exchanging data across any interface with varying needs for volume and detail of information, and applicable to a broad range of communications systems.

Continuing with FIG. 4, module 124 may comprise a modem I/M (intermodulation) component 174, a LINK 11A component 184 (processing half-duplex, netted links), a LINK 11B component 186 (processing full duplex, point-to-point links), and an XML translator 194.

Module 126 may comprise an Ethernet converter 176 (such as the ORiNOCO Ethernet Converter RS232 available from the Proxim Corporation of Sunnyvale, Calif. in the United States), a TCP/IP component 188, and an XML translator 196.

Module 128 may comprise a network interface card (NIC) 178 (such as the Linksys USB100TX Etherfast 10/100 USB Adapter available from Cisco Systems, Incorporated of Irvine, Calif. in the United States), a TCP/IP component 190, and an XML translator 198.

XML translators 192, 194, 196 and 198 receive inputs from plural sources as shown in FIG. 4. The XML translators convert data from a legacy format to a standard, platform-independent format.

It is noteworthy that modules 122, 124, 126 and 128 are similar to modules 114, 116, 118 and 120 (FIG. 3).

Policy-Based Router:

The policy-based router 130 (or 112, FIG. 3) may be operationally coupled to modules 122-128. The policy-based router 130 determines the ultimate destination of the data (such as networks 208A-208D) depending upon the security level of the data, sending the data through one of the network stacks 170A-170D, and through a corresponding application interface 110A-110D.

A security module 200 is used to choose which appropriate network stack 170A-170D to send the data based on the security level of the data. The security module 200 could be hardware-based or software-based. A processor 202 is used to execute instructions, via a software interface 206, regarding the path of data through the secured network processor 108.

The policy-based router may have a static IP address. The policy-based router assigns dynamic virtual IP addresses, with reference to a virtual IP address table 204, to the data, depending upon the appropriate security level.

For example, if network 208A is intended for secret level data, a virtual IP address would be assigned to the secret level data. The secret level data would then be sent through a network stack 170A, limited to secret level data throughput, for transmittal to the secret level network 208A through the application interface 110A, which is also limited to secret level data throughput.

Likewise, if network 208B is intended for UBS level data, a virtual IP address would be assigned to the UBS level data. The UBS level data would be sent through a network stack 170B, limited to UBS level data throughput, for transmittal to the UBS level network 208B through the application interface 110B, which is also limited to UBS level data throughput.

Similarly, any non-secure data may be directed to non-secure networks (for example, network 208C or network 208D) through non-secure network stacks (for example, network stack 170C or network stack 170D), through application interfaces (for example, application interface 110C or application interface 110D) for transmittal to non-secure networks (for example, network 208C or network 208D). Virtual IP addresses would be assigned to the non-secure data.

Networks:

The networks 208A-208D may be any type of network supporting flight systems on an aircraft. For example, network 208A may be an avionics domain network. Network 208B may be an on-board C2ISR (command, control, intelligence, surveillance, and reconnaissance) network. Network 208C may be a delivery domain network, pertaining, for example, to cargo tracking systems, such as Radio Frequency Identification (RFID) or pertaining to a Flight Control System (FCS) and network 208D may be a registry domain network.

Figure 5:
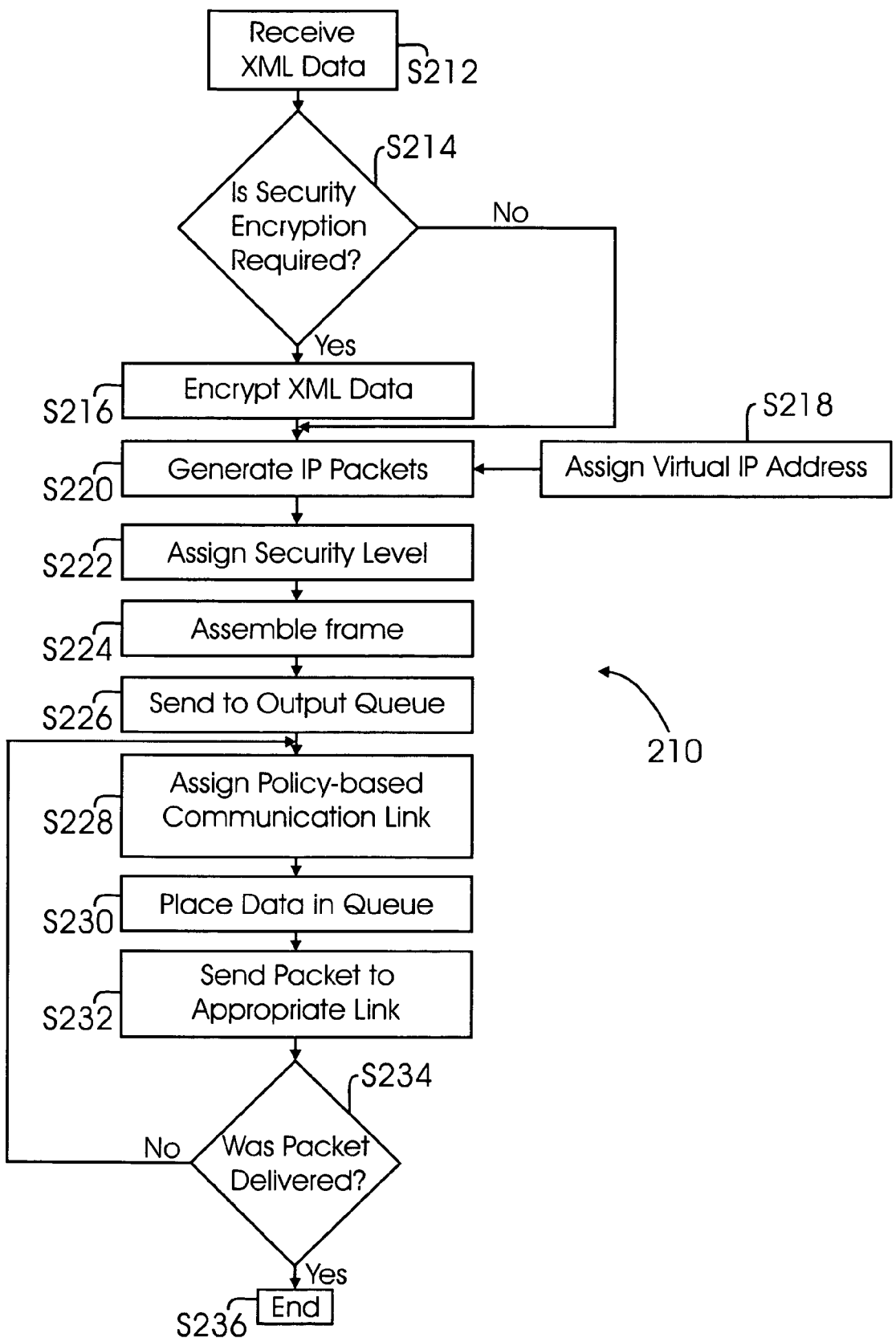
FIG. 5 is a flow chart of a method for communicating between networks, according to an embodiment of the present invention.

Method of Forward Linking Data Between Networks:

FIG. 5 shows a flow chart of a method 210 for forward linking data between networks (for example, data output from a secured network processor). In step S212, XML data is received by router 130. For example, application interface 110A sends XML data to router 130.

In step S214, router 130 determines if any type of encryption is required. This determination is based on the type of data and the destination. As discussed above, some links are secured to handle secured communication, while others are unsecured. In one aspect, an application interface (for example, 110A) sets a flag that notifies router 130 whether encryption is needed.

If encryption is needed, then in step S216, secure module 200 encrypts the data. Secure module 200 may use any type of security algorithm to encrypt the received data. For example, SSL (secured socket layer) or Advanced Encryption Standard (AES) may be used to encrypt the data. It is noteworthy that the adaptive aspects of the present invention are not limited to any particular type of encryption technique or system. If encryption is not needed, then the process moves to step S218.

In step S218, router 130 assigns a virtual IP address to the packet. This is based on a virtual IP address table 204. It is noteworthy that an aircraft itself is assigned a unique IP address. Communication that is being sent from the aircraft via specific links is assigned virtual IP addresses.

In step S220, router 130 generates IP packets. In step S222, router 130 using security module 200 assigns a particular security level (for example, very secured, secured, UBS, or non-secured) for the IP packet. The level of security on a link and the assignment is based on the type of packet, i.e., a higher security level is assigned to a packet that requires higher security, whereas, a lower security level is assigned to a packet that requires lower security. This ensures that the packet is sent via a secured or unsecured link depending on the type of packet. Router 130 firmware may use a security setting table (not shown) to set the appropriate security level.

In step S224, router 130 assembles the frame and then in step S226, router 130 sends the frame to an output queue (not shown).

In step S228, the appropriate link is assigned for the packet. Router 130 may use standard rules to assign the appropriate link.

In step S230, the packet is placed in a queue for a specific link and in step S232, router 130 sends the packet via the assigned link. Router 130 continues to monitor the link to ensure that the packet has been sent. If the packet is successfully sent, then the process ends in step S236. If the link fails to send the packet, then the process reverts back to step SS228.

Figure 6:
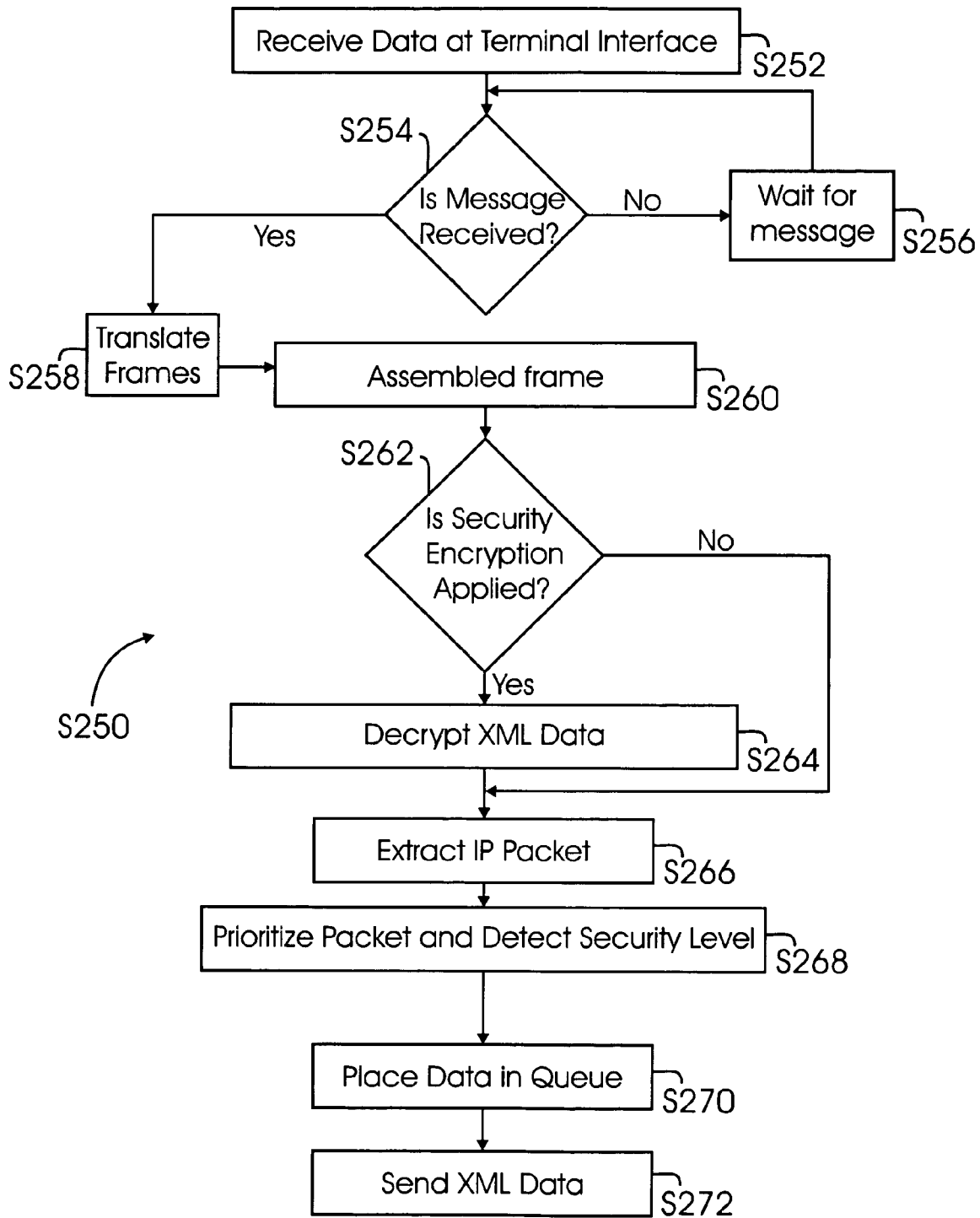
FIG. 6 is a flow chart of another method for communicating between networks, according to a further embodiment of the present invention.

Method of Reverse Linking Data Between Networks:

FIG. 6 shows a flow chart of a method 250 for reverse linking data between networks (for example, data input to a secured network processor). In step S252, data is received at a terminal interface. For example, as shown in FIG. 4, terminal interface 172 receives data via radio link 106A.

In step S254, router 130 confirms if a message has been received properly. If not, then SNP 108 waits for the message.

If a message is properly received, then in step S258, the message is translated into a standard format. For example, XML translator 192 translates the data received via terminal interface 172 into an XML format.

In step S260, the frame is assembled by module 192 for a frame queue (not shown). The frame queue is used by router 130 to assign priority for processing frames.

In step S262, router 130 determines if any encryption has been applied. This is based on the type of data that is received and/or the destination to which the frame will be sent by router 130. If encryption has been applied, then the packet is decrypted by security module 200. If encryption is not applied, then the process moves to step S266.

In step S266, router 130 extracts the IP packets. In step S268, the packet is assigned a security level and priority level by router 130. The security level may be high, medium or low, based on packet content and/or packet destination.

In step S270, the packets are forwarded by router 130 and placed in an output queue. In step S272, the XML data is transmitted to the appropriate destination, via a network stack and application interface.

Figure 7:
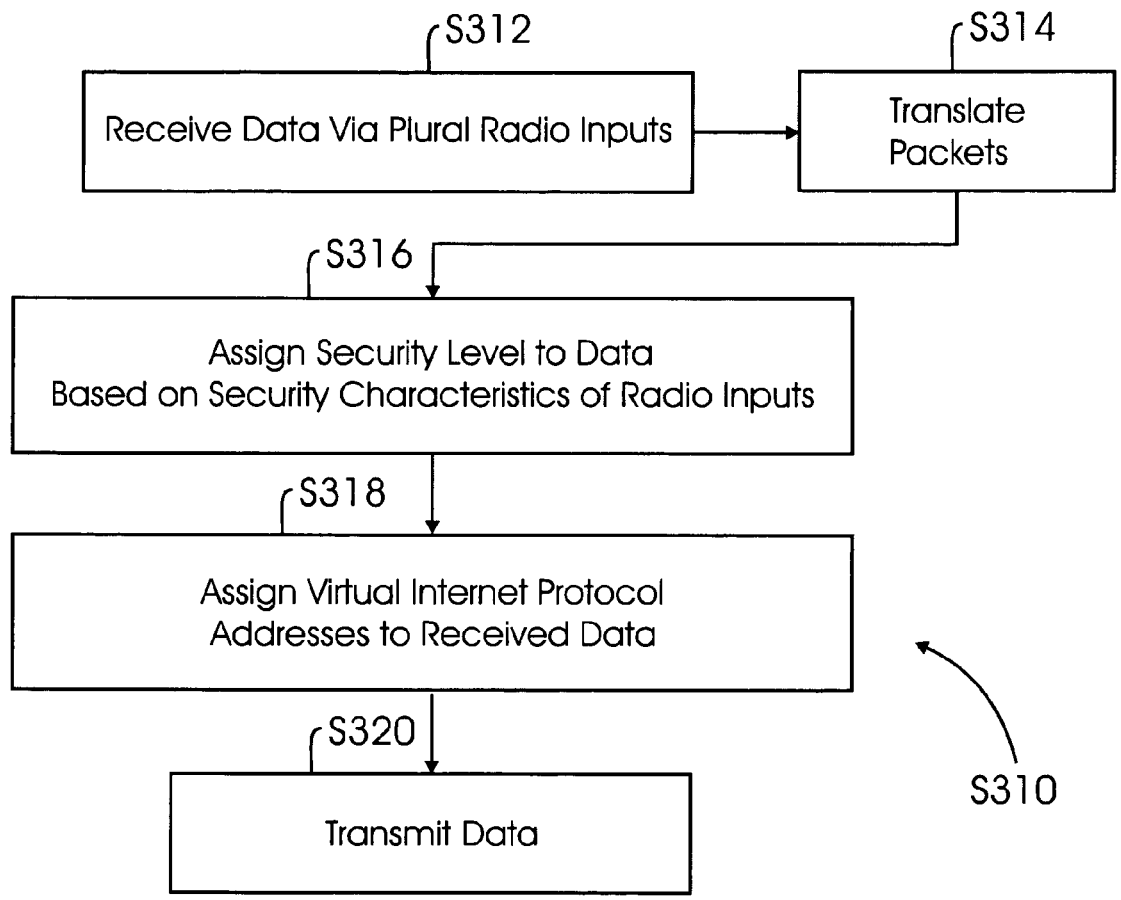
FIG. 7 is a flow chart of yet another method for communicating between networks, according to a still further embodiment of the present invention.

Method of Sharing Data Between Networks:

FIG. 7 shows a flow chart of a method 310 for sharing data between networks. The method 310 comprises a step S312 of receiving data from plural inputs. The plural inputs may be radio inputs. The data may be any type of information, such as information that includes one of the groups consisting of control data, audio, voice, image, and video.

In step S314, data received from the radio links is converted into a standard format, for example, the XML format (using XML translator 192).

In step S316, router 130 assigns security levels to the data based on security characteristics of the inputs and the destination of the packets. In step S316, router 130 assigns virtual Internet protocol addresses using virtual IP address table 204. In step S320, the data, in a standard format, is transmitted to the appropriate destination.

In one aspect of the present invention, an integrated system is provided, that receives inputs from plural disparate sources, converts the data into a standard format and based on the type of data and destination, the data is transmitted. This system is scalable, modular and efficient.

Although the present invention has been described with reference to specific embodiments, these embodiments are illustrative only and not limiting. Many other applications and embodiments of the present invention will be apparent in light of this disclosure and the following claims.

The invention claimed is:

1. A system for receiving a plurality of data from plural radio inputs, translating the plurality of data, and sending the plurality of data to a plurality of otherwise incompatible networks, comprising:
   a plurality of first application interfaces connected to a first secured network processor, the first secured network processor comprising a first policy based router and a plurality of first non-internet protocol radio devices;
   a second secured network processor comprising a plurality of second non-internet protocol radio devices, the second secured network processor connected to the first secured network processor by a plurality of non-internet protocol radio links, each of the plurality of non-internet protocol radio links connecting one of the first non-internet protocol radio devices to a corresponding one of the plurality of second non-internet radio devices;
   a second policy based router in the second secured network processor, the second policy based router connected to an XML translator in each of the plurality of second non-internet protocol radio devices;
   a plurality of network stacks connected to the second policy based router and to a plurality of second application interfaces, each of the plurality of second application interfaces connected to a corresponding network, wherein each of the plurality of network stacks direct the plurality of data in cooperation with the second policy-based router to one or more of the plurality of second application interfaces;
   wherein the plurality of data may be exchanged among one or more of the plurality of second non-internet protocol radio devices, the second policy-based router and one or more of the plurality of network stacks; and
   wherein one or more of the plurality of second application interfaces sends the data to one or more networks.

2. The system of claim 1, wherein the second policy-based router determines a security level of the data traveling by the plurality of non-internet protocol radio links to the plurality of second non-internet protocol radio devices.

3. The system of claim 1, wherein each of the plurality of second non-internet protocol radio devices comprises a radio control interface that keeps a link active, receives the plurality of data from link, reformats the plurality of data, parses the plurality of data, recognizes the plurality of data, and aligns the plurality of data.

4. The system of claim 1, wherein the plurality of second non-internet protocol devices comprises a first device, a second device, a third device and a fourth device;
   wherein the first device comprises a terminal interface connected to a LINK-16 component and a Variable Message Format (VMF) component, and the XML translator is connected to the LINK-16 component and to the VMF component;
   wherein the second device comprises a modem intermodulation component, a LINK 11A component for processing half-duplex, netted links, a LINK 11B component for processing full duplex, point-to-point links, and the XML translator;
   wherein the third device comprises an Ethernet converter, a TCP/IP component, and the XML translator; and
   wherein the fourth device comprises a network interface card, a TCP/IP component and the XML translator.

5. The system of claim 1, wherein the XML translator converts data from a legacy format to a platform independent format; and
   wherein a first data from the plurality of data is from a Beyond Line-Of-Sight Data Input Source that includes satellite-based sources, of over about 600 miles in range (UHF/VHF SATCOM), international marine and maritime satellite communications (INMARSAT), Aircraft Communications Addressing and Reporting System (ACARS), and Family of Advanced Beyond-Line-of-Sight Terminals (FAB-T); and
   wherein a second data from the plurality of data is from a Line-Of-Sight Data Input Source that includes sources, within about 0-30 miles in range, such as LINK-16, Flying Local Area Network (FLAN), and Wideband Network Waveform of the Joint Tactical Radio System (JTRS WNW).

6. The system of claim 1, wherein the second policy-based router determines a network of the plurality of networks to which the data is sent depending upon the security level of the data, sending the data through one of the network stacks, and through a corresponding application interface.

7. A method for receiving a plurality of data from plural radio inputs, translating the plurality of data, and sending the plurality of data to a plurality of otherwise incompatible networks, comprising:
   connecting a plurality of first application interfaces to a first secured network processor, the first secured network processor comprising a first policy based router and a plurality of first non-internet protocol radio devices;
   connecting a second secured network processor to the first secured network processor by a plurality of non-internet protocol radio links, wherein the second secured network processor comprises a plurality of second non-internet protocol radio devices, and wherein each of the plurality of non-internet protocol radio links connects one of the first non-internet protocol radio devices to a corresponding one of the plurality of second non-internet radio devices;
   connecting a second policy based router in the second secured network processor to an XML translator in each of the plurality of second non-internet protocol radio devices;
   connecting a plurality of network stacks to the second policy based router and to a plurality of second application interfaces, each of the plurality of second application interfaces connected to a corresponding network, wherein each of the plurality of network stacks direct the a data of the plurality of data in cooperation with the second policy-based router to one or more of the plurality of second application interfaces;
   exchanging a plurality of data among one or more of the plurality of second non-internet protocol radio devices, the second policy-based router and one or more of the plurality of network stacks; and
   sending the plurality of data to one or more networks by one or more of the plurality of second application interfaces.

8. The method of claim 7, further comprising:
   determining, by the second policy-based router, a security level of the data traveling by the plurality of non-internet protocol radio links to the plurality of second non-internet protocol radio devices.

9. The method of claim 7, wherein each of the plurality of second non-internet protocol radio devices comprises a radio control interface that keeps a link active, receives the plurality of data from link, reformats the plurality of data, parses the plurality of data, recognizes the plurality of data, and aligns the plurality of data.

10. The method of claim 7, wherein the plurality of second non-internet protocol devices comprises a first device, a second device, a third device and a fourth device;

- wherein the first device comprises a terminal interface connected to a LINK-16 component and a Variable Message Format (VMF) component, and the XML translator is connected to the LINK-16 component and to the VMF component;
- wherein the second device comprises a modem intermodulation component, a LINK 11A component for processing half-duplex, netted links, a LINK 11B component for processing full duplex, point-to-point links, and the XML translator;
- wherein the third device comprises an Ethernet converter, a TCP/IP component, and the XML translator; and
- wherein the fourth device comprises a network interface card, a TCP/IP component and the XML translator.

11. The method of claim 7, wherein the XML translator converts data from a legacy format to a platform independent format; and

- wherein a first data from the plurality of data is from a Beyond Line-Of-Sight Data Input Source that includes satellite-based sources, of over about 600 miles in range (UHF/VHF SATCOM), international marine and maritime satellite communications (INMARSAT), Aircraft Communications Addressing and Reporting System (ACARS), and Family of Advanced Beyond-Line-of-Sight Terminals (FAB-T); and
- wherein a second data from the plurality of data is from a Line-Of-Sight Data Input Source that includes sources, within about 0-30 miles in range, such as LINK-16, Flying Local Area Network (FLAN), and Wideband Network Waveform of the Joint Tactical Radio System (JTRS WNW).

12. The method of claim 7, further comprising:

determining, by the second policy-based router, a network of the plurality of networks to which the data is sent depending upon the security level of the data; and sending the data through one of the network stacks, and through a corresponding application interface.

* * * * *